(12) United States Patent
Krumel et al.

(10) Patent No.: US 7,782,530 B1
(45) Date of Patent: Aug. 24, 2010

(54) DEPLOYABLE TELESCOPE HAVING A THIN-FILM MIRROR AND METERING STRUCTURE

(75) Inventors: Leslie J. Krumel, Cedar Crest, NM (US); Jeffrey W. Martin, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 471 days.

(21) Appl. No.: 11/767,607

(22) Filed: Jun. 25, 2007

Related U.S. Application Data

(60) Provisional application No. 60/816,475, filed on Jun. 26, 2006.

(51) Int. Cl.
*G02B 23/00* (2006.01)
*H01Q 15/14* (2006.01)
*E04H 12/18* (2006.01)

(52) U.S. Cl. .................. 359/399; 359/406; 359/408; 343/915; 52/646

(58) Field of Classification Search ............ 359/85–861
See application file for complete search history.

(56) References Cited

U.S. PATENT DOCUMENTS 3,635,425 A * 1/1972 Swet ................ 244/172.7
5,898,529 A    4/1999 Meyer et al.
6,683,311 B1 * 1/2004 Wuest ..................... 250/397
6,768,582 B1 * 7/2004 Hachkowski et al. ....... 359/399
6,930,654 B2    8/2005 Schmid et al.
6,970,143 B2   11/2005 Allen et al.
7,098,867 B1 * 8/2006 Gullapalli .................. 343/915
2005/0183377 A1 * 8/2005 Johnson ..................... 52/646
2008/0290221 A1 * 11/2008 Dupuis et al. ............ 244/172.6

OTHER PUBLICATIONS

Brittany Sauser, "Giant Mirror for a New Space Telescope", Technology Review (published by Technology Review Inc., an independent media company owned by the Massachusets Institute of Technology, May 18, 2007.

* cited by examiner

*Primary Examiner*—Thong Nguyen

(57) ABSTRACT

A deployable thin-film mirror telescope comprises a base structure and a metering structure. The base structure houses a thin-film mirror, which can be rolled for stowage and unrolled for deployment. The metering structure is coupled to the base structure and can be folded for stowage and unfolded for deployment. In the deployed state, the unrolled thin-film mirror forms a primary minor for the telescope and the unfolded metering structure positions a secondary minor for the telescope.

38 Claims, 9 Drawing Sheets

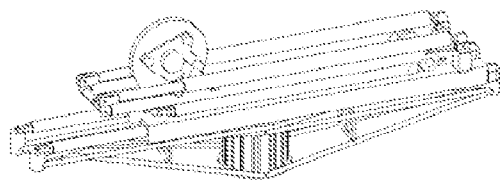
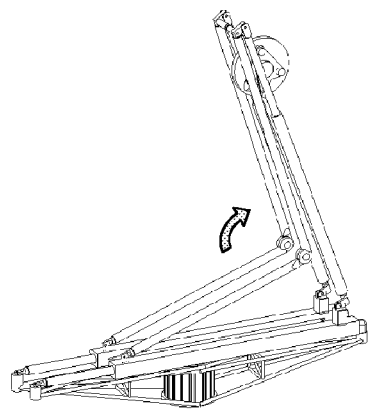
FIG. 4A    FIG. 4B
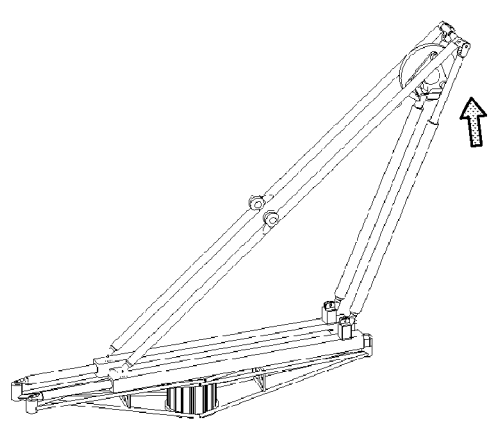
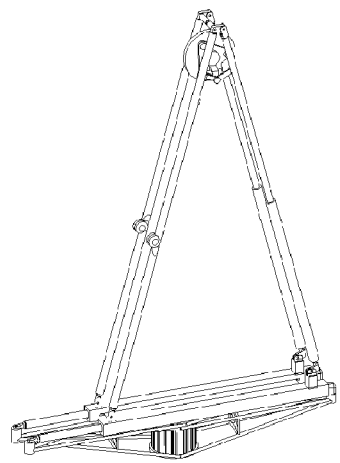
FIG. 4C    FIG. 4D
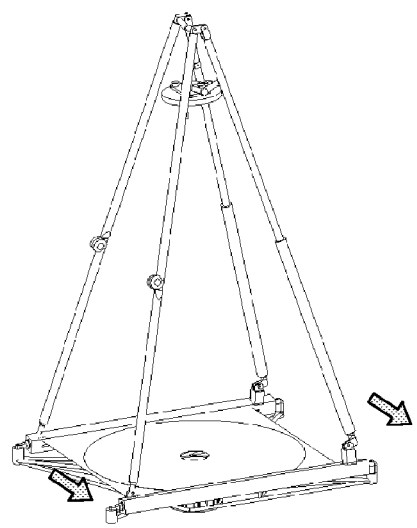
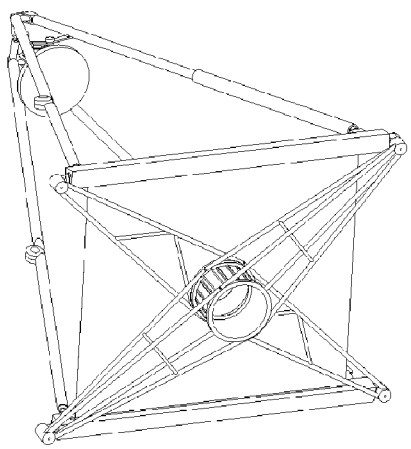
FIG. 4E    FIG. 4F

DEPLOYABLE TELESCOPE HAVING A THIN-FILM MIRROR AND METERING STRUCTURE

CROSS REFERENCE TO RELATED APPLICATIONS

This application claims the benefit of U.S. Provisional Application No. 60/816,475, filed Jun. 26, 2006, which is incorporated by reference in its entirety.

STATEMENT REGARDING FEDERALLY SPONSORED RESEARCH OR DEVELOPMENT

This invention was developed under Contract DE-AC04-94AL85000 between Sandia Corporation and the U.S Department of Energy. The U.S. Government has certain rights in this invention.

BACKGROUND

This invention relates generally to optical systems, and in particular to the deployment of a folding telescope having a thin-film minor, a base structure, and a metering structure.

A challenge for designers of telescopes for space applications is how to create larger telescopes that may be lifted into orbit. This limitation is due, in part, to the size restrictions for payloads of the vehicles that are launched into space, as payload space in these vehicles is limited in both size and weight. Another consideration for designing large telescopes is the need to achieve a desired shape and placement of the telescope's optical surfaces. Although certain large structures have been deployed into space to serve with good success, e.g., as radio antennas and reflectors, ever larger telescopes are generally more difficult to deploy due to the requirement for perfect shape and positioning of the optical surface.

One approach for deploying large telescopes into space involves transporting segmented minors (i.e., where segmented mirrors are defined as a series of individually-linked, solid minors) to reduce the payload size. Once transported into space, the segmented minors can be moved from stowed positions and assembled to form the primary mirror of a telescope. These segmented mirrors are relatively large and heavy due to their structure, so these previous solutions do not take advantage of certain newer technologies, such as thin-film mirrors.

Accordingly, techniques are needed for packaging larger telescopes efficiently (e.g., for transportation into space), while also supporting telescope deployment into a proper form for use.

SUMMARY OF THE INVENTION

To address certain problems unmet by existing solutions, various embodiments of the present invention comprise a folding telescope that can be deployed from a very compact shape for use as a telescope. In a stowed configuration (i.e., an undeployed state; also, a retracted configuration), the telescope may be suited to fit inside a slender, cylindrical vessel, such as a payload on a launch vehicle. In a deployed configuration, the telescope can be used for its intended purpose, such as for viewing images from space.

In various embodiments of the invention, a deployable thin-film mirror telescope comprises a base structure and a metering structure. The base structure houses a thin-film primary mirror, which can be rolled for storage and unrolled for deployment. The metering structure is coupled to the base structure and can be folded for storage and unfolded for deployment of the telescope. In the deployed state, the unrolled thin-film minor forms a primary minor for the telescope, and the unfolded metering structure positions a secondary minor for the telescope.

Compared to previous systems, the deployable thin-film minor telescope in various embodiments may overcome many technical obstacles, including one or more of the following: how to package a large sheet of thin-film mirror material without folds or wrinkles; how to protect an optical surface from scratches without having to eject a protective cover; how to deploy a large sheet of minor material in a predictable, orderly fashion; how to position a large sheet of mirror material accurately without over-redundant constraints; how to re-package a large sheet of mirror material remotely and retract the mechanism; and how to extend a secondary mirror without a low-order torsional bending mode.

BRIEF DESCRIPTION OF THE DRAWINGS

FIGS. 4A-4F are isometric views illustrating the deployment of a thin-film minor telescope with a metering structure and a base structure, in accordance with an embodiment of the invention.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

Figure 1:
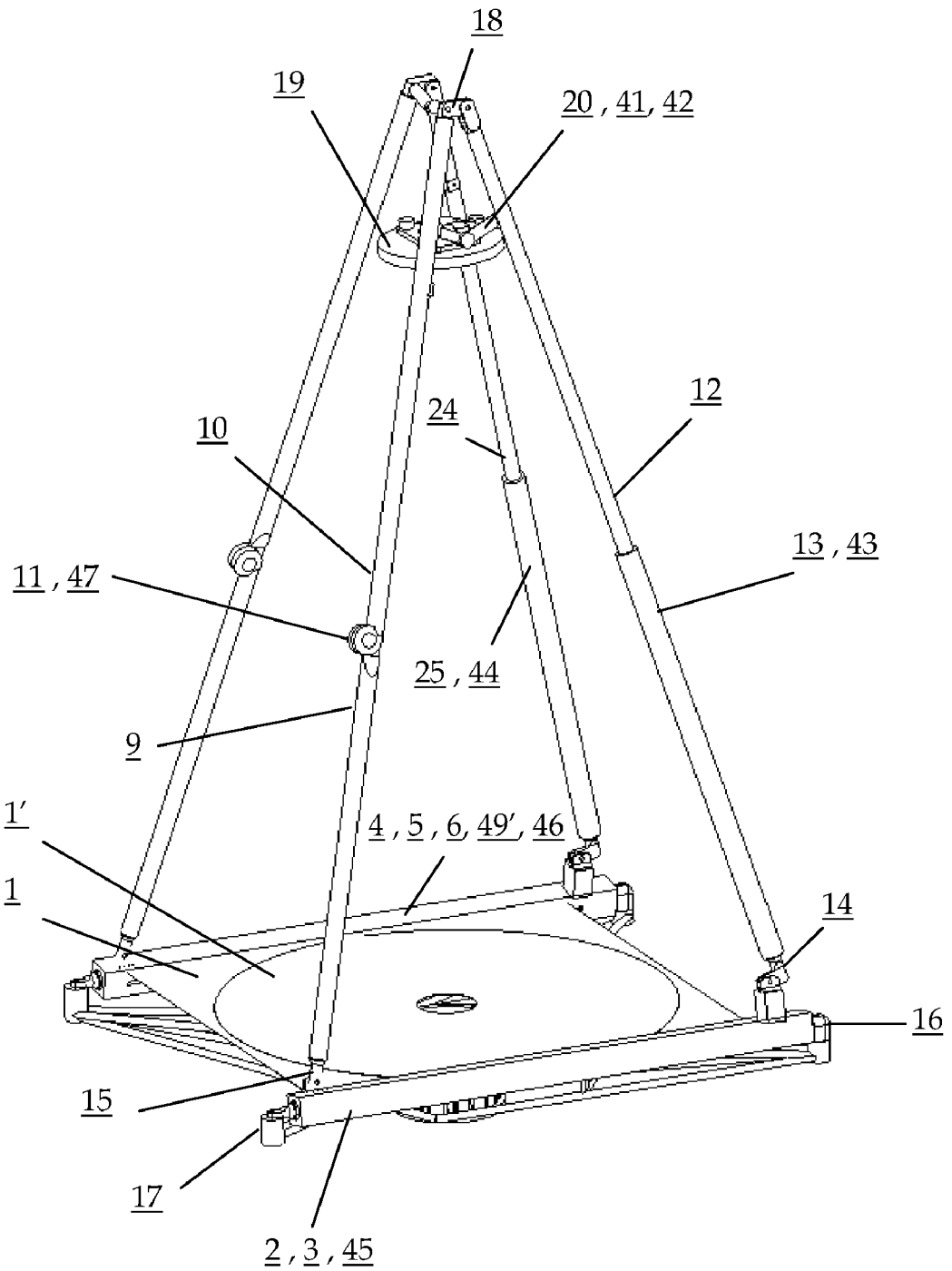
FIG. 1 is an upper isometric view of a thin-film mirror telescope in deployed state, in accordance with an embodiment of the invention conveying the thin-film sheet similar to the action of a "window shade".
Figure 2:
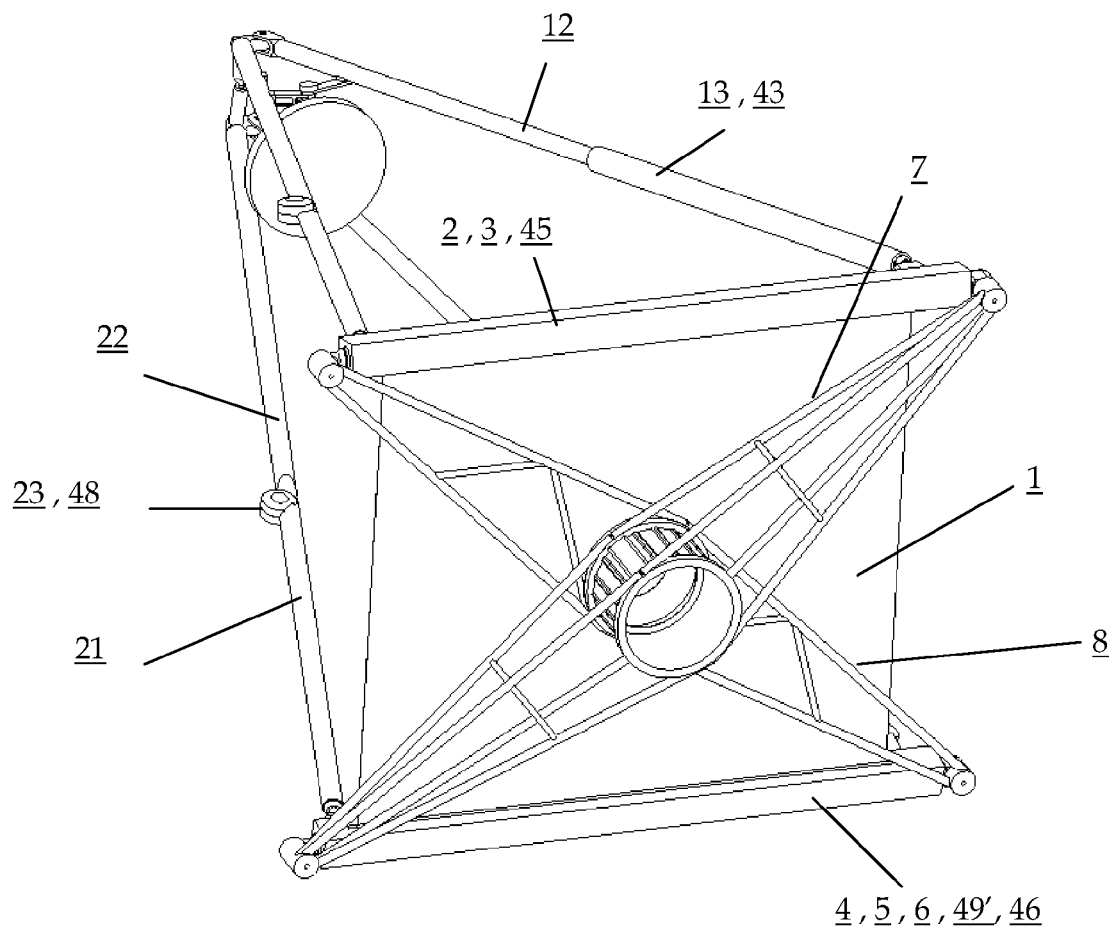
FIG. 2 is a lower isometric view of a thin-film mirror telescope in deployed state, in accordance with an embodiment of the invention conveying the thin-film sheet similar to the action of a "window shade".
Figure 3:
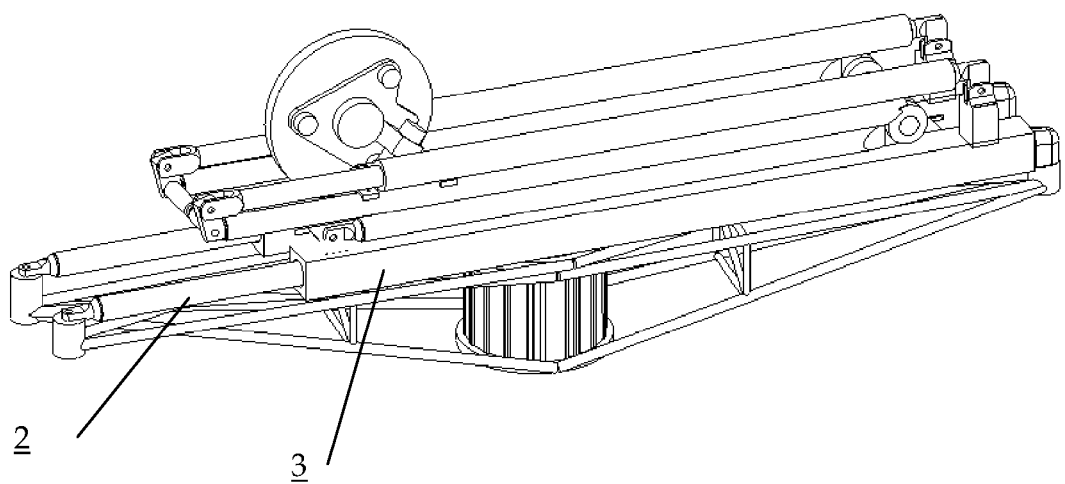
FIG. 3 is an isometric view of a thin-film minor telescope in a contracted or stowed state, in accordance with an embodiment of the invention.
Figure 5:
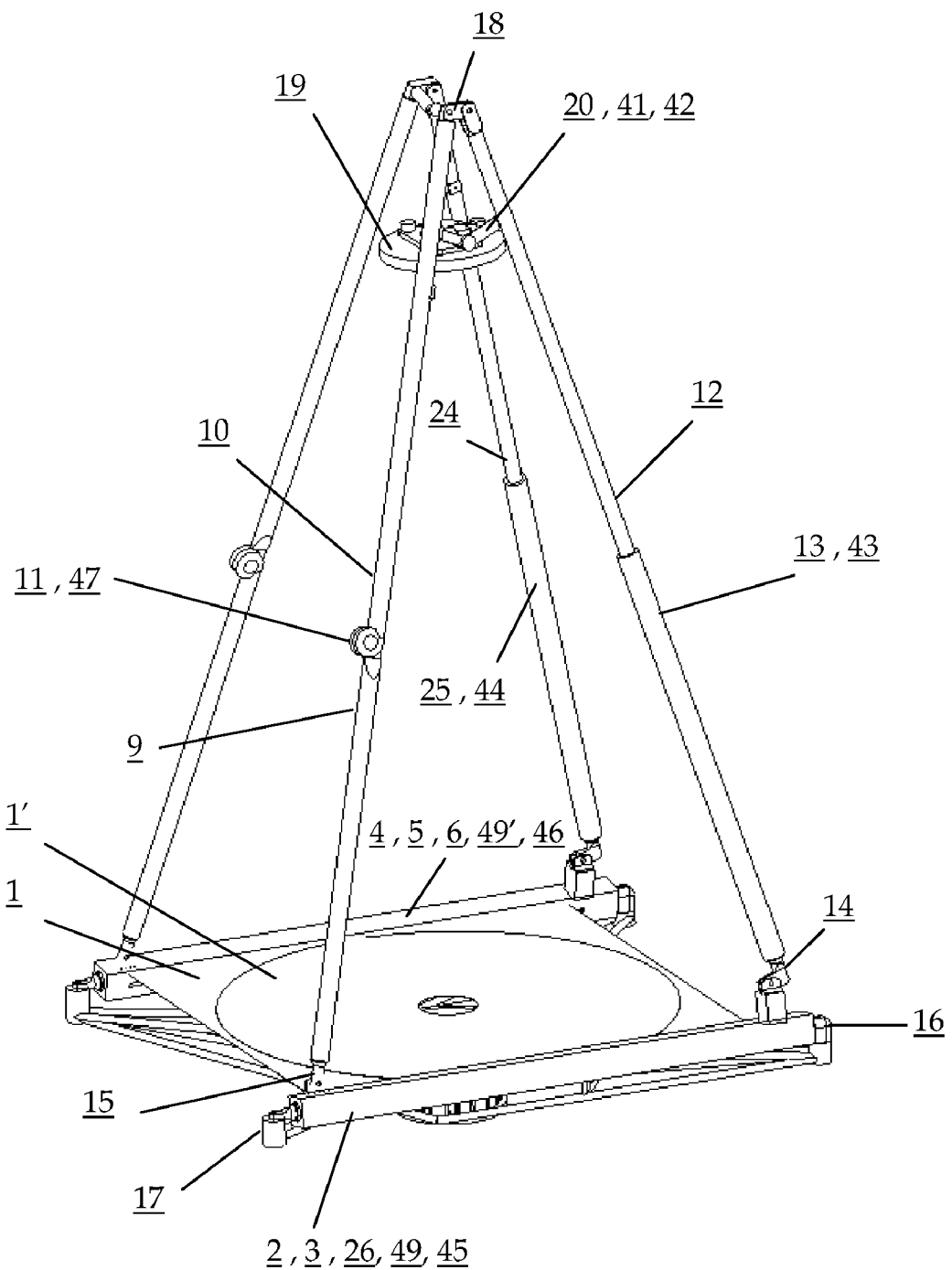
FIG. 5 is an upper isometric view of a thin-film mirror telescope in deployed state, in accordance with an embodiment of the invention conveying the thin-film sheet similar to the action of a "scroll".
Figure 6:
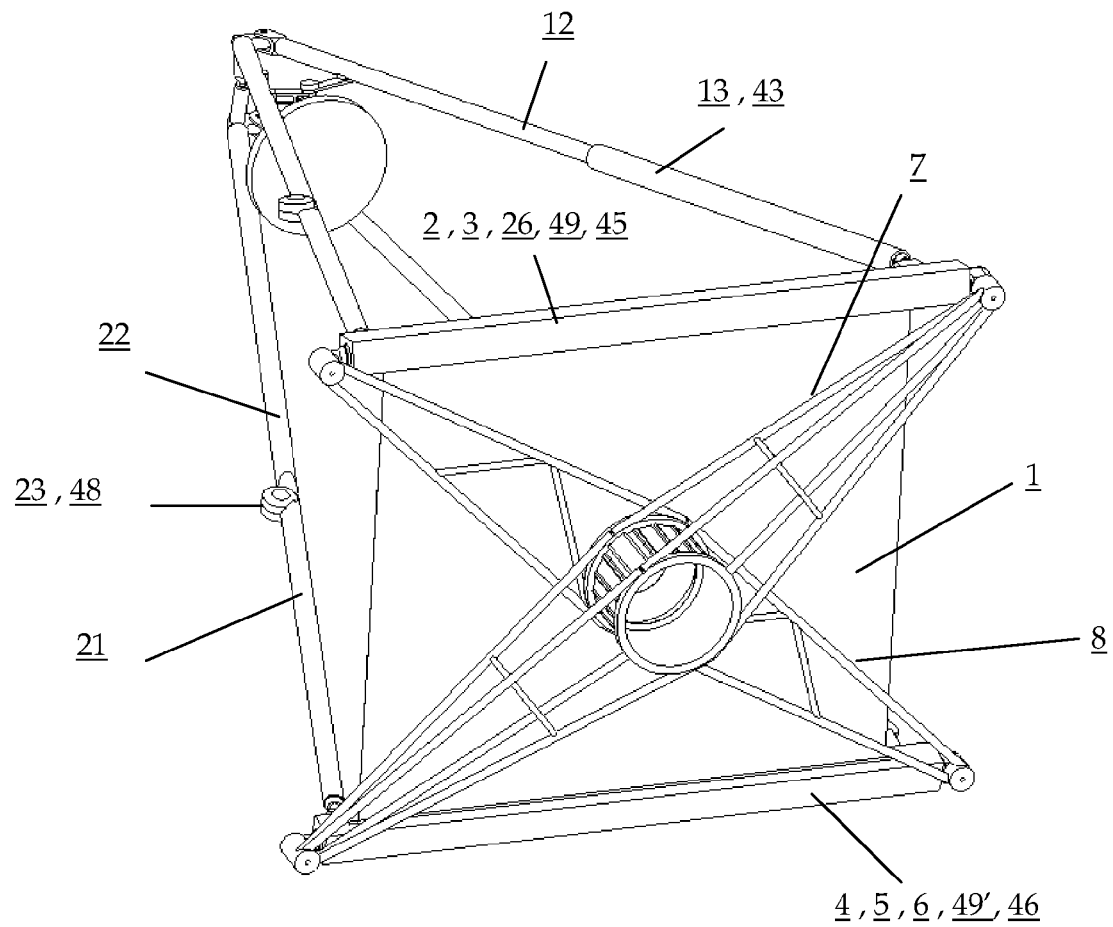
FIG. 6 is a lower isometric view of a thin-film mirror telescope in deployed state, in accordance with an embodiment of the invention conveying the thin-film sheet similar to the action of a "scroll".

In various embodiments of the present invention, an optical assembly includes primary and secondary mirrors attached to deployable structures to form a folding telescope. In one embodiment, this optical assembly forms a Cassegrain telescope. In another embodiment, this optical assembly forms a Newtonian telescope. FIGS. 1 and 2 are isometric views of a folding telescope in its deployed state, in accordance with one embodiment, and FIG. 3 illustrates the same folding telescope in its folded or retracted state. FIGS. 5 and 6 are isometric views of a folding telescope in its deployed state, in accordance with another embodiment. As used herein, the term "deployed" refers to the system's ability to expand in size and change shape from a contracted state for storage to an expanded state for operation—as opposed to the other meaning of the term that refers to sending something away on a mission.

As illustrated in FIGS. 1, 2, 4, 5 and 6, the telescope comprises a primary minor 1' that is formed on a thin-film sheet 1 that is designed to satisfy the optical requirements of a telescope, such as a Cassegrain telescope. In another embodiment, the primary mirror 1' is rotated 45 degrees from the configurations shown in the FIGS. 1, 2, 4, 5 and 6 so that the telescope is a Newtonian telescope. In various embodiments of the invention described herein, the material of the thin-film sheet and the primary minor can be adaptively controlled so that it is sufficiently rigid during operation but otherwise remains flexible. Various embodiments of suitable thin-film mirrors for this application are described in U.S. Patent Nonprovisional application Ser. No. 11/508,657, filed Aug. 23, 2006, "System for Controlling a Thin-Film with Integrated Control (TFIC) Actuator for Use in a Controllable Shape," which is incorporated by reference in its entirety.

Primary mirror(s) formed on a thin-film sheet generally have an optical (i.e., reflecting) surface on one side and a protective surface on the other side of the thin-film sheet. In a rolled form, therefore, the protective surface of the primary mirror protects the optical surface in the rolled minor. The protective surface avoids the need for a separate item to protect the reflective surface, thus improving simplicity and avoiding the need for disposal of an item that could also interfere with the telescope or get tangled in the mechanism. Since the primary minor is a large optical component of the telescope, the use of the thin-film material for the mirror generally significantly reduces the weight of the optics used in the telescope when compared to telescopes that implement segmented mirrors.

In an embodiment of the invention, as illustrated in FIGS. 1 and 2, the thin-film nature of the primary mirror 1' allows the minor to be packaged into a very compact shape and unfurled for use. Rather than being constructed as a circular disk of rigid material, the primary mirror 1' may be formed as a single thin-film mirror on the single, continuous thin-film sheet 1, and the thin-film sheet 1 may be conveyed by the motorized rolling cylinder 4 so that the thin-film sheet 1 can be rolled up onto the rolling cylinder 4 of the contracting assembly 5,6 for storage (i.e., the undeployed state), or can be unrolled from the rolling cylinder 4 and extended in the deployed state. As shown in FIGS. 1, 2, 5, 6, and 7, the motor 49' is generally integrated within the rolling cylinder 4 and is adapted to rotate the rolling cylinder 4 for conveying the thin-film sheet 1. The conveyance of the thin-film sheet 1 in this embodiment is similar to the action of a "window shade".

Figure 8A:
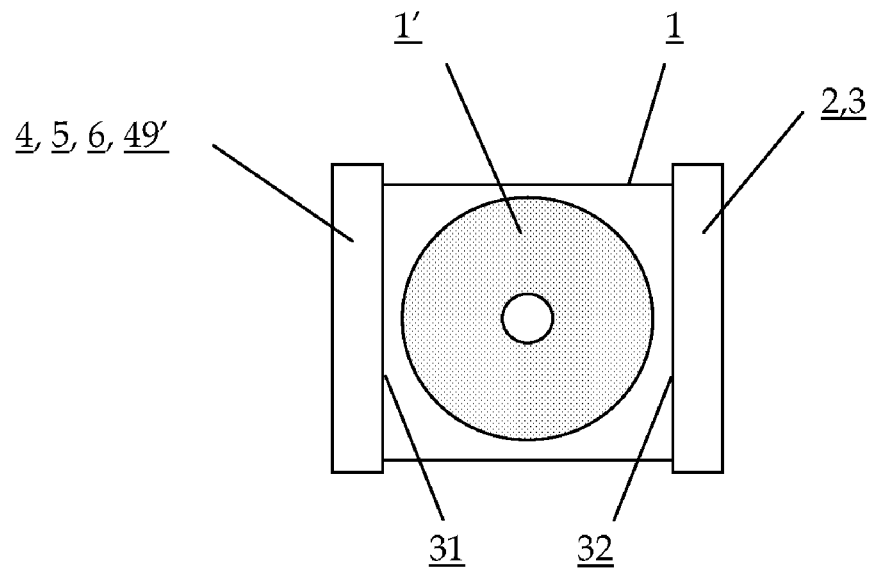
FIG. 8A is a downward notional view of an embodiment of the invention with a single primary mirror formed upon a thin-film sheet, and the exposed primary minor held between two contracting assemblies at two intersecting edges.
Figure 8B:
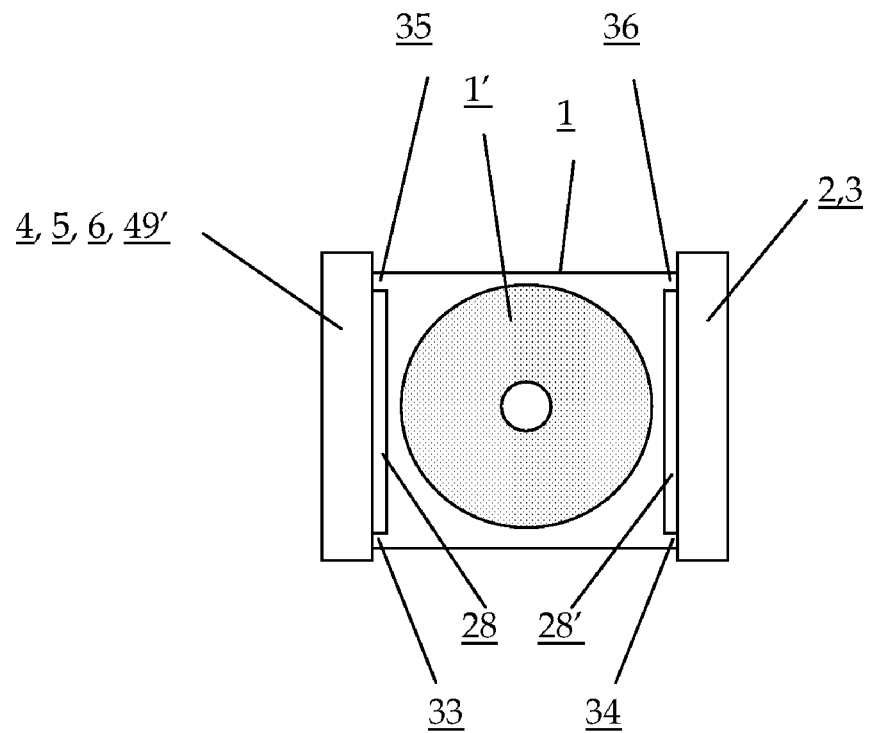
FIG. 8B is a downward notional view of an embodiment of the invention with a single primary mirror formed upon a thin-film sheet, and the exposed primary minor is effectively held between the contracting assemblies at four corners.

In various embodiments of this "window shade" action illustrated in FIGS. 1, 8A, and 8B, the thin-film primary mirror 1' may be situated on the continuous thin-film sheet 1 and exposed between the contracting assembly 4,5,6,49' and the contracting assembly 2,3. In the downward notional view of an embodiment shown in FIG. 8A, the primary mirror 1' is held between the two contracting assemblies (4,5,6,49' and 2,3) at the intersecting edge 31 of the thin-film sheet 1 that is secured to the rolling cylinder 4 and at the intersecting edge 32 of the thin-film sheet 1 that is secured to the contracting assembly 2,3. In the downward notional view of another embodiment shown in FIG. 8B, the thin-film sheet 1 has slots 28 and 28' evacuated from the thin-film sheet 1, and the primary minor 1' is effectively held between the two contracting assemblies (4,5,6,49' and 2,3) at four corners, namely the corners 33 and 35 that are secured to the rolling cylinder 4, and at the corners 34 and 36 that are secured to the contracting assembly 2,3.

In other embodiments of the invention, as illustrated in FIGS. 5, 6, 7, and 9, the single, continuous thin-film sheet 1 has various copies of the primary mirror 1' formed serially in-line on its reflective surface. The thin-film sheet 1 may be conveyed by the pairwise motion of two rolling cylinders (4 and 26) so that the thin-film sheet 1 can be rolled up onto the rolling cylinder 4 while, simultaneously, the thin-film sheet 1 can be unrolled from the rolling cylinder 26, and may also be conveyable in the other direction so that the thin-film sheet 1 can be rolled up onto the rolling cylinder 26 while, simultaneously, the thin-film sheet 1 can be unrolled from the rolling cylinder 4. The motor 49' is generally integrated within the rolling cylinder 4 and the motor 49 is generally integrated within the rolling cylinder 26, such that the motors 49' and 49 are pairwise adapted to rotate the rolling cylinders for conveying the thin-film sheet 1. The conveyance of the thin-film sheet 1 in this embodiment is similar to the action of a "scroll" and exposes only one of the primary mirror 1' copies at a time.

Figure 9A:
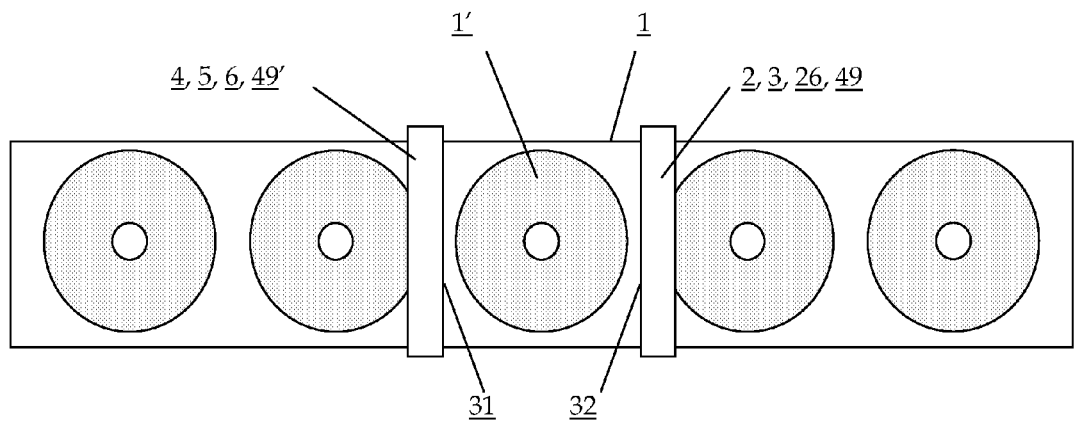
FIG. 9A is a downward notional view of an embodiment of the invention revealing a continuous thin-film sheet having multiple copies of the primary minor formed upon it, and the exposed primary minor is held between two contracting assemblies at two intersecting edges.

In an embodiment of this "scroll" action, each of the plurality of thin-film primary mirror 1' may be situated on the continuous thin-film sheet 1 in a serial in-line orientation on the "scroll" as in the downward view of an embodiment notionally illustrated in FIG. 9A. In this embodiment, a single primary mirror 1' exposed and is held between the two contracting assemblies (4,5,6,49' and 2,3,26,49) at the intersecting edge 31 of the thin-film sheet 1 that is in either secured to rolling cylinder 4 or held against the rolled portion of the thin-film sheet 1 on rolling cylinder 4, and at the intersecting edge 32 of the thin-film sheet 1 that is either secured to the rolling cylinder 26 or held against the rolled portion of the thin-film sheet 1 on rolling cylinder 26.

Figure 9B:
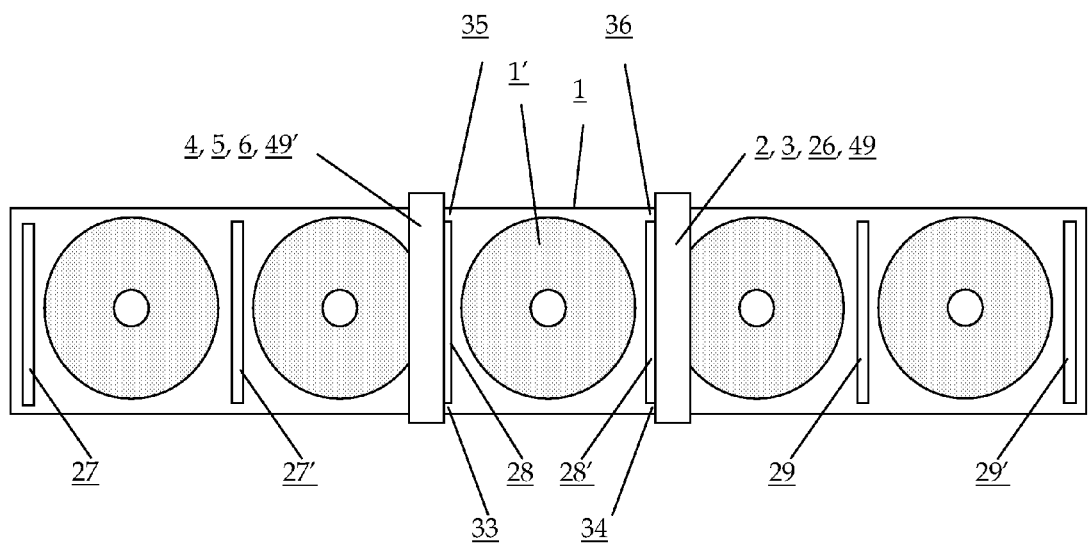
FIG. 9B is a downward notional view of an embodiment of the invention revealing a continuous thin-film sheet having multiple copies of the primary minor formed upon it, and the exposed primary minor is effectively held between the contracting assemblies at four corners.

In another embodiment of this "scroll" action, as notionally illustrated in FIG. 9B, slots 27, 27', 28, 28', 29, and 29' may be evacuated in the thin-film sheet 1 between adjacent copies of the primary mirror 1' in order to separate the individual thin-film minor copies and to enable the exposed primary minor 1' to be effectively held to the rolling cylinders 4 and 26 at just the four corners, namely, to corners 33 and 35, and to corners 34 and 36, respectively. As each primary mirror 1' is conveyed into position between the two contracting assemblies (4,5,6, 49' and 2,3,26,49), the evacuated slots 28 and 28' in thin-film sheet 1 produces the four corners 33, 35, 34, 36 at the edges of the exposed primary mirror 1', and these four corners effectively hold the exposed primary minor 1' at the intersection of each of these corners with the rolled portions of the thin-film sheet 1 on the rolling cylinders 4 and 26.

Note that FIGS. 9A and 9B depict notional illustrations for example purposes only of an unrolled thin-film sheet 1 containing five primary mirror 1' copies formed thereon. Of the plurality of primary mirror 1' copies, only a single primary minor 1' is positioned between the contracting assemblies 4,5,6,49' and 2,3,26,49 and exposed at a time. In actual applications, the number of primary minor 1' copies is not required to be five, and may be any number of at least one. In addition, all of the primary mirror 1'copies will not be visible as they are shown in these notional illustrations since, in application, they are hidden in the rolled portion of the thin-film sheet 1 on the rolling cylinders 4 and 26, with the exception of the single primary minor 1' that is exposed for use.

Embodiments of the invention described herein express actions for conveying the thin-film sheet 1 and the primary mirror 1' in an orderly, predictable manner rather than fluttering in a random process. The thin-film sheet 1 is conveyed as needed, while also permitting operation of the primary minor 1' as an adaptively controlled mirror. Conveying the thin-film sheet 1 and primary mirror 1' by various rolling actions allow the reflective surface of the primary mirror 1' to be continuous while also enabling the primary mirror 1' to be retracted into a compact form when not in use.

Moreover, embodiments described herein for deployment of, and reversing the deployment of, the invention are repeatable and reversible and, thus, possesses many advantages in application. For example, rolling the optical surface of the primary mirror avoids the problems of lines, wrinkles, or other damage that may be caused by other methods, such as those methods that employ folding of the optical surface of the primary minor rather than rolling. In addition, the characteristics described for thin-film mirrors offer significant advantages when compared to segmented mirrors. Segmented minors (e.g., segmentation of the primary minor) can cause gaps or distortions in the primary minor, which are detrimental in telescope applications.

In various embodiments shown in the FIGS. 1 through 6 as well as other embodiments, the present invention comprises an expandable (for deployment to a deployed state) and contractable (for reverse deployment to an undeployed state) base structure. In embodiments comprising a single thin-film sheet 1 with a single primary minor 1' formed upon it, and employing a thin-film sheet 1 conveying action similar to a "window shade" described previously (see FIGS. 1 and 2), the base structure includes a pair of contracting assemblies, such that one contracting assembly is formed by parts 2 and 3 and the other is formed by parts 4, 5, 6, and 49'. The contracting assembly 5,6 includes the rolling cylinder 4 and its integrated motor 49', which are designed for conveyance to present and extend (i.e., to unroll from, or to roll off-of the rolling cylinder) the thin-film sheet 1 and, thus, expose the primary mirror 1' during deployment. The thin-film sheet 1 is attached to the rolling cylinder 4 so that the thin-film sheet 1 can be rolled onto and around the rolling cylinder 4 in a stowed state. An opposite end of the thin-film sheet 1 is attached to the other contracting assembly 2,3.

In the deployment action for this embodiment, the contracting assembly 2,3 is separated from the other contracting assembly 4,5,6,49', the thin-film sheet 1 is pulled off of the rolling cylinder 4 and the primary mirror 1' is exposed between the two contracting assemblies. In this way, one contracting assembly 4,5,6,49' presents the thin-film sheet 1 from the rolling cylinder 4, while the other contracting assembly 2,3 is used to extract the thin-film sheet 1 from the rolling cylinder 4. Note that this deployment action is also reversible, such that as the contracting assembly 2,3 and the other contracting assembly 4,5,6,49' are converged toward each other, the thin-film sheet 1 is conveyed and rolled onto and around the rolling cylinder 4, while also concealing the primary mirror 1'.

In embodiments comprising a single, continuous thin-film sheet 1 formed with multiple copies of primary mirror 1' serially in-line, and employing a thin-film sheet 1 rolling action similar to a "scroll" described previously (see FIGS. 5 and 6), the base structure includes a pair of contracting assemblies, where one contracting assembly is form by parts 2, 3, 26 and 49, and the other contracting assembly is formed by parts 4, 5, 6 and 49'. In this embodiment, the contracting assembly 2,3 includes the rolling cylinder 26 and its integrated motor 49; and, the contracting assembly 5,6 includes the rolling cylinder 4 and its integrated motor 49', such that the contracting assemblies 2,3,26,49 and 4,5,6,49' are designed for conveyance to receive (i.e., to roll onto and around the rolling cylinder) or to present and extend (i.e., to unroll from, or to roll off-of the rolling cylinder) the thin-film sheet 1 and, thus, expose a selected primary minor 1' between the pair of contracting assemblies during deployment. In the deployment action for this embodiment, the contracting assembly 2,3,26, 49 is separated from the other contracting assembly 4,5,6,49', the thin-film sheet 1 is unrolled from either the rolling cylinder 4 or the rolling cylinder 26, and the primary minor 1' is exposed between the two contracting assemblies. Note that this deployment is also reversible, such that as the contracting assembly 2,3,26,49 and the other contracting assembly 4,5, 6,49' are converged toward each other, the thin-film sheet 1 is conveyed and rolled onto and around either the rolling cylinder 4 or the rolling cylinder 26, while also concealing the primary mirror 1'.

Figure 7:
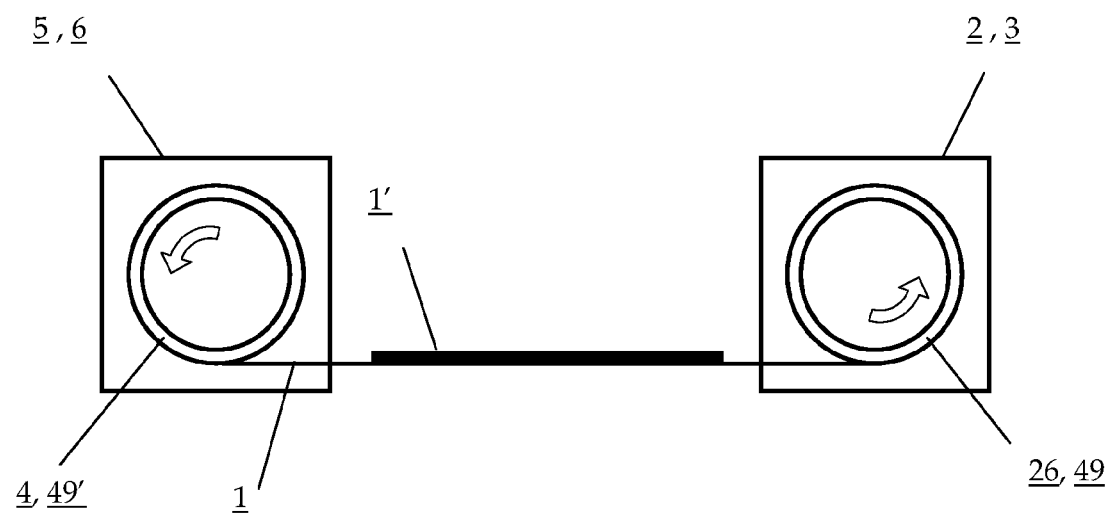
FIG. 7 is a sideward notional illustration of an embodiment of the invention with the thin-film sheet having multiple copies of the primary mirror formed upon it such that the thin-film sheet is rollable around two rolling cylinders similar to the action of a "scroll".

A sideward portion of this embodiment is notionally illustrated in FIG. 7, showing that cylinder 4 and cylinder 26 are each motorized by integrated motors 49' and 49, respectively, so that as rolling cylinder 4 feeds out the thin-film sheet 1, rolling cylinder 26 simultaneously takes up the unused portion. In this embodiment, this "scrolling" action is reversible so that the thin-film sheet 1 may also be rolled in either direction. The two rolling cylinders 4 and 26 work together to expose any one of the primary mirror 1' copies on the thin-film sheet 1 between the contracting assemblies during deployment. An advantage of embodiments that implement a "scroll" action with a variety of primary mirror 1' copies formed on a thin-film sheet 1, allows for when the surface of a primary minor becomes damaged or otherwise poor, the rolling cylinders can be rolled to expose a new primary minor surface for use as the primary mirror in the telescope application.

For various embodiments of the present invention, the contracting assemblies 2,3 and 5,6 of the base structure are coupled to opposite corners of a "scissors" mechanism, which is formed in one embodiment by two lightweight trusses 7 and 8 joined at their centers. For example, the contracting assembly 2,3 is attached to the scissors mechanism 7,8 so that the opposite ends of the contracting assembly 2,3 are connected to two of the free ends of the scissors mechanism 7,8 (such as the top of an "X"), and the other contracting assembly 5,6 is attached to the scissors mechanism 7,8 so that the opposite ends of the contracting assembly 5,6 are connected to the opposite ends of the scissors mechanism 7,8 (such as the bottom of an "X").

The trusses 7 and 8 of the base structure may be expanded to open for deployment (as shown in FIG. 2 and FIG. 6) or may be contracted to close for reverse deployment to an undeployed or stowed state (as shown in FIG. 3). As the scissors mechanism 7,8 is expanded to open, or is contracted to close, the two contracting assemblies 2,3 and 5,6 are generally kept in parallel relation to each other and are somewhat similar in length and size. Moreover, the contracting assemblies 2,3 and 5,6 will slidably contract and elongate in length according to the movement of the trusses 7 and 8. Specifically, the contracting assemblies 2,3 and 5,6 will slidably contract in length as the trusses 7,8 are opened, and the contracting assemblies 2,3 and 5,6 will slidably elongate in length as the trusses are contracted or collapsed.

For various embodiments described herein, the base structure is fitted with controllable actuators generally integrated within the contracting assemblies that are adapted to expand the base structure for deployment, and to contract the base structure for reverse deployment to an undeployed or stowed state. In one embodiment, as shown in FIG. 1, the actuator 45 is integrated within the contracting assembly 2,3, and the actuator 46 is integrated within the contracting assembly 4,5,6. The contraction or expansion of the base structure is, thus, controllably actuated to move the contracting assemblies 2,3,45 and 4,5,6,46 away from (i.e., expansion) or toward (i.e., contraction) each other by actuators 45 and 46, respectively. From a stowed position, as described previously, as the contracting assemblies 2,3,45 and 4,5,6,46 are moved away from each other while keeping their parallel orientation, the scissors mechanism 7,8 will expand to open. In various embodiments with "window shade" action, the separation of the contracting assemblies 2,3,45 and 4,5,6,46 causes the thin-film sheet 1 to be conveyed and rolled off-of the rolling cylinder 4, such that the primary mirror 1' is exposed and is in tension similar to a square sail. Being completely unfurled in one embodiment, the thin-film sheet 1 and the primary minor 1' may be attached to the contracting assemblies 2,3 and 4,5,6 only at its corners, as illustrated in FIG. 8B. The primary minor 1' may be relaxed for operation as an actively controlled optic element.

Similarly, in various other embodiments with "window shade" action, the contracting assemblies 2,3 and 4,5,6 are separated, the scissors mechanism 7,8 will expand to open, and the rolling cylinder 4 is actuated to convey the thin-film sheet 1 to roll off-of the rolling cylinder 4, so that a single primary minor 1' is exposed and positioned between 2,3 and 4,5,6, and is in tension similar to a square sail, as illustrated in FIG. 8A. The thin-film sheet 1 and the primary minor 1' may be held between the contracting assemblies 2,3 and 4,5,6 along intersecting edges 31 and 32 of the thin-film sheet 1 that are in contact with the rolled portion of the thin-rolled sheet 1 on rolling cylinder 4. The primary minor 1' may then be operated as an adaptively controlled optic element.

For various embodiments of the present invention, whether expanding or contracting the base structure, the scissors mechanism 7,8 keeps the two axes of the contracting assemblies 2,3 and 5,6 generally in the same plane with each other, which in turn keeps the thin-film primary minor 1' generally in a flat plane. Once deployed, the primary mirror 1' may be adaptively controlled with variable curvatures to form a desired final optical shape.

The present invention further includes a secondary mirror 19, which is attached to a metering structure. The metering structure is designed to unfold in a manner to increase the relative distance between the primary mirror 1' and the secondary minor 19 for operation of the telescope. The metering structure also enables the secondary mirror 19 to be folded back onto the retracted base structure for storage.

As illustrated in the FIGS. 1 through 6, the metering structure in accordance with one embodiment comprises a double bipod. Each bipod is formed by two struts, a folding strut (e.g., comprising parts 9 and 10, joined by a joint 11) and a telescoping strut (e.g., formed by parts 12 and 13, one inside the other, with telescoping action). In this way, one bipod comprises folding strut 9,10 joined by joint 11, and telescoping strut 12,13; while the other bipod comprises folding strut 21,22 joined by joint 23, and telescoping strut 24,25.

Each bipod is fitted with a controllable folding actuator to control the unfolding of the folding struts during deployment, and to control the folding of the folding struts during reverse deployment into the undeployed or stowed configuration. As shown in FIGS. 1, 2, 5, and 6, actuator 47 controls the folding strut 9,10,11, and the actuator 48 controls the folding strut 21,22,23. Each bipod is also fitted with a controllable telescoping actuator integrated within the telescoping strut structure to control the extension of the telescoping struts during deployment, and to control the contraction of the telescoping struts during reverse deployment into the undeployed or stowed configuration. As shown in FIGS. 1, 2, 5, and 6, actuator 43 controls the telescoping strut 12,13, and the actuator 44 controls the telescoping strut 24,25. The deployment and the reverse deployment motions of the metering structure struts are remotely controllable by commands to the folding actuators and telescoping actuators.

The secondary minor 19 is located at or near the apex 18 of the two bipods. In one embodiment, the secondary mirror 19 is attached to the structure by a folding drag link 20 connected between the upper parts (e.g., 10 and 12) of the bipods. The drag link 20 may be designed to unfold and to position the secondary minor 19 in a desired location and orientation for the telescope upon deployment. With the bipods spread apart, at least one actuator 41 initiates the drag link 20 to move the secondary mirror 19 into position over a central axis of the primary mirror 1'. The drag link 20 may be folded and retracted for reverse deployment into the undeployed or stowed configuration.

In one embodiment, the present invention is fitted with actuators to controllably actuate two additional degrees of freedom of motion for the secondary minor 19. The configuration described enables control of the angular alignment of the secondary mirror 19 over an axis of the primary mirror 1'. One intrinsic feature of the embodiments described herein is that optical quality alignment on the micron scale can be achieved by adaptive control of the primary minor 1' and controlling the position of the secondary mirror 19 with actuators—that is, errors in the alignment of each minor may be continuously corrected in real-time. For example, the actuators 41 and 42 (as shown in FIGS. 1 and 5) may be remotely commanded to initiate the drag link 20 to move the secondary minor 19, and to adjust and correct the position of the secondary minor 19 for rough tip and tilt, and the primary minor 1' may be adaptively controlled by remote command to move to adjust for fine correction.

FIGS. 4A-F illustrate a method for deploying the telescope from a stowed configuration to an open configuration. Each bipod takes a shape similar to a flattened "Z" when in the stowed configuration, as shown in FIG. 4A. The flat portion at the top of the "Z" represents both parts of the telescoping strut 12,13 and 24,25 with the inner part retracted. The two opposite ends of the flattened "Z" represent the folding strut 9,10 and 21,22, which are connected to the base structure.

Upon actuation of the folding struts 9,10 and 21,22, the elbow joints 11 and 23 straighten out so that each bipod forms a triangle such that the folding strut 9,10 or 21,22 is generally twice the length of the telescoping strut 12,13 or 24,25, respectively. This action is illustrated in the sequence of FIGS. 4B and 4C. Then, actuation of the telescoping struts 12,13 and 24,25 causes the shorter telescoping struts 12,13 and 24,25 to extend until both legs of the bipods are of equal length. As shown in FIG. 4D, duplicate bipods 9,10,12,13 and 21,22,24,25 are formed to create a pyramid that has exceptional torsional rigidity and stiffness. Note that with other embodiments of the invention, other pyramid-like shapes are possible. In one embodiment, the action of both bipods occurs simultaneously as parallel mechanisms, since both are joined at their apex 18.

Once the metering structure has been unfolded, the base structure is expanded to fully deploy the telescope, as shown in FIGS. 4E and 4F. The base structure may be expanded by actuating the contracting assemblies 2,3 and 5,6, as described above. This causes the contracting assemblies 2,3 and 5,6 to move apart and thereby unroll the thin-film sheet 1 and exposing the primary minor 1'. Once deployed, the secondary mirror 19 may be positioned in any position over the primary mirror 1' by selective adjustment in any number of actuators described herein.

In various embodiments, the previously described deployment operation is reversible and also fully redundant, an objective that is usually desirable but not always achievable for high consequence space applications. In the reverse deployment operation, closing of the scissors mechanism 7,8 (e.g., by commanding actuators 45 and 46 to contract the contracting assemblies 2,3 and 5,6, respectively) results in rolling the thin-film sheet 1 and the primary minor 1' back onto the rolling cylinder 4. In this way, the deployed telescope may be folded back into a stowed configuration.

For each step in the deployment sequence, the necessary motion may be attributed to an actuator in one or both of two opposite parts, such as any of the number of joints in the telescope. Due to the constraints of the structure in the various embodiments described, a failure of one actuator may be compensated by another. In one embodiment, therefore, a clutch and brake is used on the joints so only one actuator is operational at a time. This mechanism may require the use of a spherical joint at the apex 18. If the bipods are pinned at the base joints 14 and 15, it may be necessary to use two degree of freedom joints 16 and 17 at the ends of the scissors mechanism 7,8.

The overall configuration of this deployed telescope is very strong. Each of the diagonal cross-members in the scissors mechanism joins two diagonally opposed struts on the metering structure to form a triangle (e.g., defined by parts 7, 21, 22, 12, and 13), which is a basic and efficient shape of a structure. Another triangle (e.g., defined by parts 8, 9, 10, 24, and 25) intersects the first to form a general pyramid shape of the telescope. The square base structure is reinforced by triangles formed with the base of the bipods and the scissors mechanism (e.g., defined by parts 3, 7, 6, and 8). Moreover, as described above, two symmetrical contracting assemblies 2,3 and 5,6 are used as the basis for transporting the thin-film sheet 1 and the primary mirror 1'. To achieve a coherent design, these contracting assemblies 2,3 and 5,6 (or just parts 3 and 6 thereof) serve as bases for the bipods as well.

In various embodiments described herein, a fourth strut is provided in the metering structure (i.e., rather than just three). The inclusion of four struts allows for control of the general "plane" orientation of the primary mirror 1' by adjusting the length of one of the struts with an actuator (e.g., by commanding the telescoping actuator 43 of the telescoping strut 12,13, or the telescoping actuator 44 of the telescoping strut 24,25) to make corrections in the plane.

In addition, for various embodiments described herein, the control and correction of the mirrors, as well as the control of the movement of the metering and base structures, may be commanded by remotely controlling actuators positioned at various joints in the structures of the invention. These elements enable remote operation, which may be a critical capability, at least for certain embodiments, when the invention is deployed as a space-based telescope.

The compactness of the stowed configuration of the telescope, shown in FIG. 4A, is due in part to the fact that the axis of each member is made to lie parallel with the others and the surface area of the primary mirror 1' is significantly reduced when rolled onto a rolled cylinder and oriented similarly to the other members. Such a stowed configuration for a telescope saves both weight and storage space in comparison with conventional instruments of similar size. These are often important considerations for space applications, considering the expense and limitations of launch vehicles.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above teachings. It is therefore intended that the scope of the invention be limited not by this detailed description, but rather by the claims appended hereto.

What is claimed is:

1. A deployable thin-film mirror telescope, comprising:
   a thin-film sheet comprising at least one thin-film primary minor, wherein the at least one thin-film primary minor comprises an adaptively controlled minor;
   a base structure comprising at least one rolling member adapted to convey the thin-film sheet wherein the at least one rolling member is further adapted to receive the thin-film sheet rolled therearound in an undeployed state, and wherein the at least one rolling member is further adapted to unroll and to extend the thin-film sheet in a deployed state; and the base structure further comprising at least one actuator controllable to expand the base structure from the undeployed state to the deployed state, and further controllable to contract the base structure from the deployed state to the undeployed state;
   a secondary mirror;
   a metering structure coupled to the base structure and the secondary minor, the metering structure adapted to fold in the undeployed state and further adapted to unfold and to position the secondary minor at a greater relative distance from the at least one thin-film primary mirror in the deployed state; and
   wherein the telescope is configurable from the undeployed state to a deployed state.

2. The telescope of claim 1, wherein the at least one thin-film primary mirror is formed on a top surface of the thin-film sheet and a protective film is formed on a bottom surface of the thin-film sheet.

3. The telescope of claim 1, wherein the base structure further comprises:
   a first member coupled to the at least one rolling member; and
   a second member coupled to an edge of the thin-film sheet, wherein the at least one thin-film primary mirror is coupled to the edge of the thin-film sheet such that the second member and the at least one thin-film primary mirror are coupled at the edge, and wherein the first and second members are arranged to separate based on an actuation of the base structure.

4. The telescope of claim 3, wherein the first member and the second member are coupled to opposite ends of a scissors mechanism.

5. The telescope of claim 1, wherein the base structure further comprises:

a first member coupled to the at least one rolling member; and a second member coupled to a first corner and to a second corner of the thin-film sheet, wherein the at least one thin-film primary mirror is coupled to the first corner and to the second corner, and wherein the at least one thin-film primary minor is coupled to the second member, and wherein the first and second members are arranged to separate based on an actuation of the base structure.

6. The telescope of claim 5, wherein the first member and the second member are coupled to opposite ends of a scissors mechanism.

7. The telescope of claim 1, wherein the metering structure comprises:
   a pair of bipods, wherein each bipod comprises:
      a folding strut coupled to a telescoping strut, wherein the folding strut and telescoping strut are further coupled to the base structure at different locations;
      at least one folding actuator controllable to move the folding strut from the undeployed state to the deployed state, and further controllable to move the folding strut from the deployed state to the undeployed state; and
      at least one telescoping actuator controllable to move the telescoping strut from the undeployed state to the deployed state, and further controllable to move the folding strut from the deployed state to the undeployed state.

8. The telescope of claim 1, wherein the metering structure comprises:
   at least four struts coupled to the base structure to form a pyramid, wherein a length of at least one of the struts is controllable to adjust a general plane orientation of the base structure relating to the metering structure.

9. The telescope of claim 1, further comprising:
   at least one actuator coupled to the secondary mirror, wherein the actuator is controllable to adjust an angular alignment of the secondary mirror with respect to the at least one thin-film primary mirror.

10. The telescope of claim 9, wherein the at least one thin-film primary mirror and the secondary mirror are remotely controllable.

11. The telescope of claim 1, wherein the telescope is reversibly configurable from the deployed state to the undeployed state.

12. The telescope of claim 7, wherein the base structure and the metering structure are remotely controllable to cause the telescope to move from the undeployed state to the deployed state, and further controllable to cause the telescope to move from the deployed state to the undeployed state.

13. The telescope of claim 1, wherein the thin-film sheet further comprises:
   a plurality of thin-film primary minors formed serially in-line on a top surface of the thin-film sheet; wherein the base structure further comprises:
      the at least one rolling member and a second rolling member pairwise adapted to convey the thin-film sheet wherein the first rolling member is adapted to receive the thin-film sheet rolled therearound while the second rolling member is adapted to unroll the thin-film sheet.

14. The telescope of claim 13, wherein the thin-film sheet is held between the first rolling member and the second rolling member at a first intersection of the top surface of the thin-film sheet with a bottom surface of the thin-film sheet rolled about the first rolling member, and at a second intersection of the top surface of the thin-film sheet with the bottom surface of the thin-film sheet rolled about the second rolling member; and wherein the at least one thin-film primary minor is coupled to the first intersection, wherein the first thin-film primary mirror is coupled to the first rolling member; and wherein the first thin-film primary minor is coupled to the second intersection, wherein the first thin-film primary mirror is coupled to the second rolling member.

15. The telescope of claim 13, wherein the thin-film sheet further comprises:
   a plurality of slots evacuated from the thin-film sheet wherein each slot is in-line evacuated between adjacent thin-film primary minors, and wherein the thin-film sheet is held between the first rolling member and the second rolling member at a first intersection of a first top surface corner of the thin-film sheet with a bottom surface of the thin-film sheet rolled about the first rolling member, and at a second intersection of a second top surface corner of the thin-film sheet with the bottom surface of the thin-film sheet rolled about the first rolling member, and at a third intersection of a third top surface corner of the thin-film sheet with the bottom surface of the thin-film sheet rolled about the second rolling member, and at a fourth intersection of a fourth top surface corner of the thin-film sheet with the bottom surface of the thin-film sheet rolled about the second rolling member; and wherein the at least one thin-film primary mirror is coupled to the first top surface corner and the second top surface corner, wherein the first thin-film primary mirror is coupled to the first rolling member; and wherein the first thin-film primary mirror is coupled to the third top surface corner and the fourth top surface corner, wherein the first thin-film primary mirror is coupled to the second rolling member.

16. The telescope of claim 1, wherein the telescope is a Cassegrain telescope.

17. The telescope of claim 1, wherein the telescope is a Newtonian telescope.

18. A deployable thin-film mirror telescope, comprising:
   a thin-film sheet comprising at least one thin-film primary minor coupled to at least one rolling mechanism;
   a secondary mirror coupled to the at least one thin-film primary minor by a foldable structure;
   a means for conveying the thin-film sheet to expose the first thin-film primary mirror for the telescope; and
   a means for unfolding the foldable structure to position the secondary mirror in a greater relative distance from the first thin-film primary mirror to form the telescope.

19. The telescope of claim 18, wherein the means for conveying and the means for unfolding are reversible to allow the telescope to be returned to an undeployed state.

20. The telescope of claim 18, further comprising:
   a means for adjusting an angular alignment of the secondary mirror over an axis of the first thin-film primary mirror.

21. A method of deploying a thin-film minor telescope, the method comprising:
   unfolding a metering structure, the metering structure coupling a base structure to a secondary mirror, the unfolding increasing a relative distance between the base structure and the secondary minor;
   expanding the base structure, the base structure coupling a thin-film sheet to the metering structure, and the metering structure further coupling the thin-film sheet to the secondary mirror; and
   conveying the thin-film sheet, wherein the thin-film sheet comprises at least one thin-film primary mirror, and the metering structure further coupling the at least one thin-film primary mirror to the secondary mirror.

22. The method of claim 21, wherein the thin-film sheet comprises a surface having a protective film opposite an optical surface of the at least one thin-film primary mirror.

23. The method of claim 21, wherein the at least one thin-film primary mirror comprises an adaptively controlled mirror.

24. The method of claim 21, wherein the metering structure comprises a pair of bipods and a drag link, wherein each bipod comprises a folding strut coupled to a telescoping strut, the folding strut and telescoping strut further coupled to the base structure at different locations, and wherein the unfolding comprises:
   unfolding the folding struts for each bipod;
   extending the telescoping struts of each bipod; and
   unfolding the drag link wherein the drag link positions the secondary mirror in a deployed orientation.

25. The method of claim 21, wherein the expanding comprises:
   separating a first member coupled to a rolling member of a second member from the second member, wherein the rolling member is coupled to the thin-film sheet.

26. The method of claim 25, wherein the first member and the second member are coupled to opposite ends of a scissors mechanism, the scissors mechanism opening from a contracted position.

27. The method of claim 21, wherein the conveying comprises:
   unrolling the thin-film sheet off-of a rolling member; and
   exposing the first thin-film primary mirror.

28. The method of claim 21, wherein the metering structure comprises a pair of bipods and a drag link, each bipod comprising a folding strut coupled to a telescoping strut, the folding strut and telescoping strut further coupled to the base structure at different locations, and wherein the unfolding comprises:
   unfolding the folding struts for each bipod;
   extending the telescoping struts of each bipod; and
   unfolding the drag link from a stowed position, wherein the drag link positions the secondary minor in a deployed orientation.

29. The method of claim 28, wherein the expanding comprises:
   separating a first member coupled to a rolling member of a second member from the second member, wherein the rolling member is coupled to the thin-film sheet.

30. The method of claim 29, wherein the conveying comprises:
   unrolling the thin-film sheet off-of the rolling member; and
   exposing the at least one thin-film primary mirror.

31. The method of claim 30, further comprising:
   controlling an angular alignment of the secondary minor by adjusting a rough tip correction of the secondary minor with respect to the at least one thin-film primary mirror, and further adjusting a rough tilt correction of the secondary mirror with respect to the at least one thin-film primary minor; and
   controlling adaptively the at least one thin-film primary mirror for a fine correction of the telescope.

32. The method of claim 31, wherein controlling the angular alignment of the secondary mirror and controlling adaptively the at least one thin-film primary minor are performed by remote control.

33. The method of claim 31, wherein the method of deploying a thin-film minor telescope is further reversible in a reverse deployment, wherein the reverse deployment comprises:
   rolling the thin-film sheet onto and around the rolling member;
   converging a first member to the second member;
   folding the drag link to a stowed position;
   contracting the telescoping struts of each bipod;
   folding the folding struts for each bipod;
   contracting the base structure; and
   folding the metering structure, the folding decreasing the relative distance between the base structure and the secondary mirror.

34. The method of claim 21, wherein the method of deploying a thin-film minor telescope is further reversible in a reverse deployment, wherein the reverse deployment comprises:
   conveying the thin-film sheet;
   contracting the base structure; and
   folding the metering structure, the folding decreasing the relative distance between the base structure and the secondary mirror.

35. The method of claim 34, wherein conveying the thin-film sheet, and contracting the base structure, and folding the metering structure are performed by remote control.

36. The method of claim 21, wherein conveying the thin-film sheet, and expanding the base structure, and unfolding the metering structure are performed by remote control.

37. The method of claim 21, wherein the deployed telescope is a Cassegrain telescope.

38. The method of claim 21, wherein the deployed telescope is a Newtonian telescope.

* * * * *